MARTRIX DECODER FOR CONVOLUTIONALLY ENCODED DATA

Filed May 29, 1967 3 Sheets-Sheet 1

INVENTOR
SAMUEL T. HARMON
BY
Hauke, Krass, & Gifford
ATTORNEY

MARTRIX DECODER FOR CONVOLUTIONALLY ENCODED DATA

Filed May 29, 1967 3 Sheets-Sheet 2

INVENTOR.
SAMUEL T. HARMON

BY

Hauke, Kraus, & Gifford

ATTORNEY

Nov. 3, 1970 S. T. HARMON 3,538,497

MARTRIX DECODER FOR CONVOLUTIONALLY ENCODED DATA

Filed May 29, 1967 3 Sheets-Sheet 3

INVENTOR.

SAMUEL T. HARMON

BY

Hauke, Kraus, & Gifford

ATTORNEY 3,538,497

MATRIX DECODER FOR CONVOLUTIONALLY ENCODED DATA

Samuel T. Harmon, Ann Arbor, Mich., assignor to Datamax Corporation, Ann Arbor, Mich., a corporation of Michigan Filed May 29, 1967, Ser. No. 642,118
Int. Cl. H04q *3/02;* H04l *1/10;* G08c *25/00*
U.S. Cl. 340—146.1 16 Claims

ABSTRACT OF THE DISCLOSURE

A binary coded digital message is encoded into convolutional form and provided to a receiver over a transmission line. The receiver, or decoder, contains a code tree dictionary of possible messages arranged in matrix form and the incoming message is compared simultaneously with each of the possible messages. The correlations of the incoming message with each of the possible messages contained in the dictionary matrix are compared in order to form an estimate of the first digit of the message based on the best correlation achieved. Depending upon this estimate, one of two possible numerical manipulations is performed on the incoming message and the result is then treated as a new message and the operation is repeated to estimate the next digit of the message.

BACKGROUND OF THE INVENTION

Field of the invention

This invention relates to systems for transmitting binary coded digital messages at a maximum rate, and with maximum reliability, by redundantly encoding the message into a longer form at the transmitting end, and decoding this transmitted message at the receiving end in order to derive the original message. More particularly, this invention relates to such a system wherein the message is encoded at the transmitting end with a convolutional encoder, and is decoded at the receiving end in a sequential manner employing a code tree containing all possible messages. The particular novelty of the present invention lies in the construction of the decoder and the methods employed in decoding.

Prior art

The problem of correctly transmitting digital signals over noisy channels is a significant one, a solution to which has been actively sought. Some illustrative situations in which this problem arises are:

When telephone lines and radio links subject to noise are used to transmit data;

When an imperfect medium such as magnetic tape or photographic emulsion is used to store data;

Or when operations on binary signals are carried out by electronic circuits such as relays, diodes, or transistors which have a probability of error.

All of these situations present a common problem, which will be considered in the following description in terms of information transmission over a communication channel.

It has previously been recognized that in order to maximize the rate of transmission of binary information over an electromagnetic communication channel wherein noise is introduced, without exceeding a particular probability of error in the message at the received end, it is necessary to encode the transmitted message in some redundant form which may be decoded at the received end in order to detect and/or correct any errors introduced by the transmission process.

It has been mathematically proven that such coding systems achieve efficiencies which are directly proportional to the length of the code messages, or block length being transmitted. For example, if a message to be transmitted consists of a single binary digit, a reasonable way to transmit it consists of sending it three times, and choosing the symbol received a majority of times as the true digit. Such a system of course has a maximum efficiency or "rate" equal to about ⅓ of that of the best theoretically possible system. As longer messages are encoded, a proportionally smaller percentage of check bits are required and the efficiency of the system increases. However, in general, the complexity of the decoding equipment required increases geometrically in proportion to the block length transmitted, and the efficiency theoretically attainable through the use of very long block lengths has not been realized in practice.

One suggested system for avoiding this technical dilemma employs a convolutional code wherein each transmitted digit represents the sum of a number of separate digits in the information train. In such systems a number of digits greater than the information digit are transmitted, to add the required redundancy. Such convolutional encoders are described in detail in Principles of Communication Engineering by Wozencraft and Jacobs, John Wiley & Sons, New York, 1965, page 409 et seq.

The receivers previously used with such convolutional encoded messages are termed the sequential type. In general, they constitute computers which generate a "tree" consisting of the possible messages which might be encoded from a series of message digits. The message being actually transmitted, if received error free, will identify with certain branches along this tree. The decoder attempts to determine these particular branches, and thus identify initial digits in the message. As these digits are identified, the computer generates the following sections of the tree. Because of errors introduced in transmission the received digits may not identify exactly with a particular branch and the computer must make a decision on which branch to follow based on the degree of correlation between received message and a particular branch. In general, the computer takes a received message and starts generating branches. When a low correlation is found between the received message and the generated branch, the computer begins to generate alternate branches. This searching continues until a reasonable correlation is found. Such decoders are described in Wozencraft and Jacobs reference at page 425.

These sequential decoders present several problems. First, they are inherently quite complex and must operate at very high rates of speed in order to obtain reasonable efficiences. At any maximum rate which the decoder may achieve, occasions occur in which the search for a proper branch takes such a long time that the incoming digits can no longer be stored during the wait for this decoding process. Accordingly, the tree searching decoder must at certain intervals abandon the decoding of various sections of the message.

SUMMARY OF THE INVENTION

The present invention relates to a decoder which may be substituted for the tree searching computer type of decoder for convolutionally encoded messages. It differs from the previously described types in two main characteristics:

First, it does not continuously compute sections along a coding tree, but rather provides a fixed "dictionary" matrix which constitutes a permanent section of a decoding tree. Rather than continually adjusting the decoding tree to successive incoming digits, it modifies the incoming message based on decisions regarding the identity of previous digits so that the modified message may be compared against the stationary dictionary section.

Second, rather than comparing an incoming message with a single branch of possible messages at a time, it compares the modified incoming message segment with all possible segments simultaneously, in a parallel fashion.

The resulting decoder is structurally very simple compared to previous sequential decoders, or may alternatively be viewed as capable of decoding much longer message blocks with the same hardware as prior art units, so as to achieve greater transmission efficiency. Additionally, the present device is capable of operating at a much higher rate than the previous decoders.

As subsequently disclosed in the detailed description of one preferred embodiment of the invention, the decoder dictionary employs a two dimensional mask divided into first sections which will transmit light of a first frequency, and block all other frequencies, and second sections which transmit light of a second frequency and block light of all other frequencies, including the first frequency. For example, the first sections may be transparent to red light, and opaque to all other colors, and the second sections may be transparent to blue light and opaque to all other colors. These sections are arranged about the mask in the form of a matrix wherein a row represents the bit arrangement in a possible message, with blue sections constituting 1's and red sections 0's, and the sections arranged along a column all represent the same bit position in each of the plurality of possible messages. This mask is disposed with one surface abutting an illumination source which may consist of a number of lamp pairs equal to the number of columns in the mask matrix, or the number of binary digits in a transmitted message section, or "constraint" length being considered at a single time. The lamp pairs are arranged in alignment with the columns of the mask matrix through a spreading lens system and each pair consists of one red and one blue lamp. Only one of the lamps in a pair is illuminated at a time, and when it is illuminated its light is provided to all the matrix sections in one column. A collecting lens system is supported on the other side of the matrix. One lens is provided for each row in the matrix and these lenses act to collect light passing through all the elements in a row and to provide it to an output point.

This combination of a dictionary tree matrix, with possible messages arranged along rows, sandwiched between a lamp system oriented with the columns of the matrix, and a collecting lens system oriented with the rows of the matrix, transversely to the lamp system, is used to determine the correlation of an incoming message with all possible messages encoded in the matrix. This is done by using the incoming message to control the illumination of the lamps. A "1" in a particular bit position of the incoming message will cause the blue lamp associated with the same bit column in the matrix to be illuminated while the companion red lamp remains dark and a "0" causes the red lamp to light while the blue lamp remains dark. One of the lamps in each pair will be illuminated depending on the identity of the bit in the associated position of the incoming message. When a blue light is illuminated light is transmitted through all of the blue colored sections of the matrix in the particular column of that lamp, and no light is passed through the red sections. When a "0" occurs in the incoming message in the bit position associated with a particular lamp set, the red light is illuminated, passing light through those elements of the matrix in the associated column which are red, and not passing light through the other elements. Each collecting lens will then receive light from all of the elements in its associated row which have a color coinciding with the lamp illuminated in their particular column. For example, if the incoming message has the three digits 101 a row composed of the series of elements blue-red-blue will provide light to its collecting lens through all three elements. If the elements in the row are arranged red-red-blue, only the last two elements would provide light to the associated collecting lens. Thus, when the lamps are energized in accordance with a particular message sequence, the associated collecting lenses receive light from their associated rows in accordance with a number of digits of the incoming message which coincide with the coding of that row. The lens system treats red light and blue light equally, and accordingly they act to sum the number of elements in each of the matrix rows which coincide with the bits of the incoming message. A light sensitive electronic means is provided for determining which of the lenses has received the most light, and therefore which of the rows of the matrix has the highest degree of correlation with the incoming message. Based on this correlation the identity of the first digit in the coding sequence of the highest correlating row is chosen as the estimate of the first digit of the incoming sequence.

Next, the next incoming bit in the message sequence is added to the previous sequence used, and a particular binary number is added in modulo-2 form to the sequence, with the identity of the number depending upon the construction of the matrix, and whether the last identified digit was determined to be the "0" or a "1." The most significant digit of the subtraction product is then discarded and the remaining bits are taken as a new incoming message which is then compared with the tree matrix to determine the identity of the next bit.

The collecting lens system may be supplanted with a television pickup tube such as a vidicon or an image orthicon. This tube would be energized so as to successively scan each row of the matrix and count the number of elements which are illuminated in each row, and compare the numbers illuminated in each row to determine the best degree of correlation.

The illuminating lamp system may also be supplanted by a two-color cathode ray tube which generates appropriate color bars across its face under the control of the incoming message.

Another embodiment of the invention is also subsequently disclosed wherein the matrix is formed of diodes and each column has two connecting lines, one joining to all the elements in the column which are 0's and the other connecting to the 1's. The digits of the incoming messages are scanned to control the sequential energization of one line in each of the columns, and the pulse outputs at each row are summed in order to arrive at the desired correlation.

Still another embodiment is subsequently disclosed wherein a dictionary of possible messages is not maintained in permanent form, but is rather generated, one row at a time, by a digital system. Each row is compared to the modified incoming message and its correlation with that message is stored. After all of the rows have been generated, an estimate of one digit is made on the basis of the best correlation.

It is therefore seen to be the primary object of the present invention to provide a sequential decoder in which an incoming message is compared in parallel to all the messages contained in the tree to determine the best degree of correlation of the incoming message with the various branches of the tree.

Another object is to provide a sequential decoder wherein the decoding tree is maintained stationary and the incoming message is operated on to accommodate it to the fixed tree.

Other objects and advantages of the present invention will become apparent by the following detailed description of the separate preferred embodiments of the invention. The description makes reference to the accompanying drawings in which.

Figure 8:
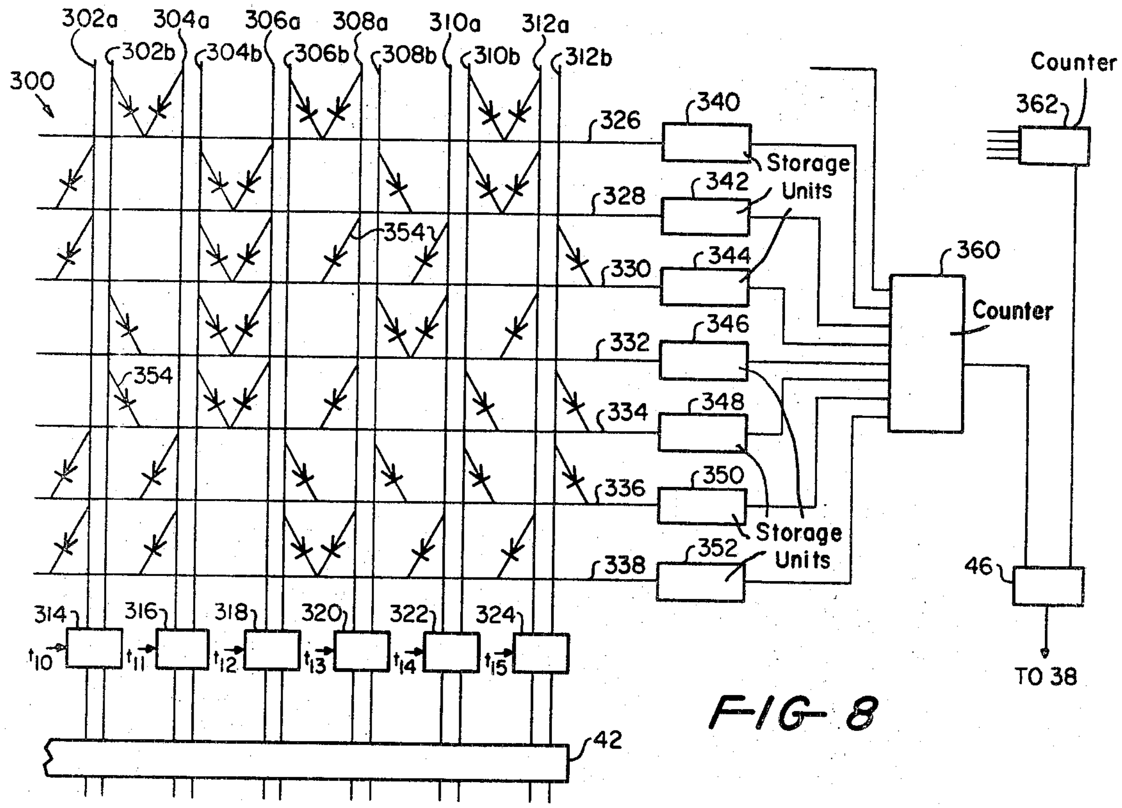
Figure 9:
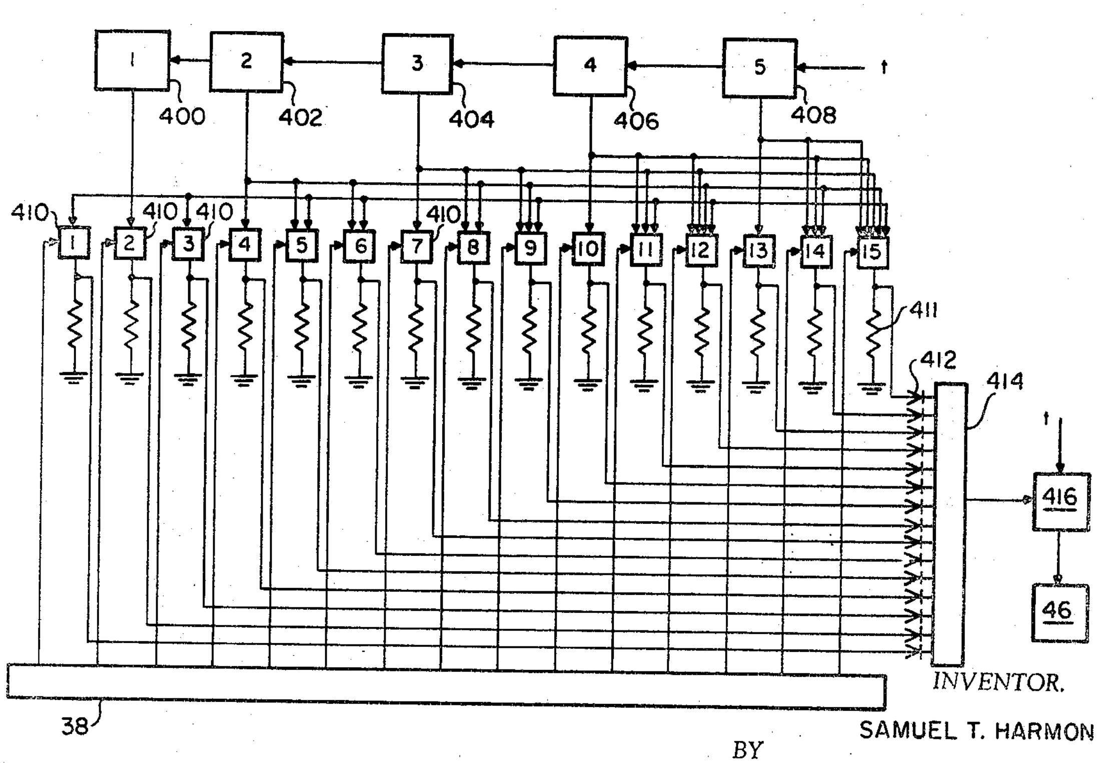

FIG. 8 is a schematic view of a diode matrix constituting a third embodiment of the present invention; and FIG. 9 is a partly schematic, partly block diagram of decoding apparatus constituting a fourth embodiment of the invention, which performs the comparison between the modified incoming message and one possible transmitted message, in parallel, and then sequentially generates the further possible messages for comparison.

While the nature of the encoding apparatus does not form part of the present invention, for purposes of illustration a binary convolutional encoder, of the type disclosed in Sequential Decoding by Wozencraft and Reifer, Research Monograph 10, of the MIT Press, Cambridge, Mass., 1960, at page 54, is employed in connection with the prefererd embodiments of the invention. This encoder is generally indicated at 10 in FIG. 1.

An incoming uncoded message in binary form is provided to the decoder on line 12, and is fed into a five stage shift register 14. By means of a clock 16 which generates a plurality of timing pulses and shift pulses slightly delayed with respect to the timing pulses, the incoming binary pulses 12 are advanced into successive stages of the shift register 14 as they are received from the line 12. The overflow pulses from shift register 14 are passed to ground via line 18.

The five stages of the shift register determine the constraint length of the code. Essentially this constraint length determines the upper limits of the efficiency of the transmission of the code, in accordance with Shannon's Theorum, and relatively long constraint lengths, substantially greater than the length of the five used in the illustration of the preferred embodiment, are desirable. The decoders formed in accordance with the present invention are capable of handling codes having relatively long constraint lengths such as twelve or fifteen, without involving an economically large amount of hardware. However, the constraint length of five employed in the preferred embodiment fully illustrates the principle and organization of the invention without involving the complexity of description which would necessarily be encountered if systems for substantially longer lengths were described.

The stages of the shift register 14 are numbered 1–5 beginning with the register section that first receives an incoming information bit from line 12. Stage 1 is connected to an AND gate 20 and to two modulo-2 adders 22 and 24; stage 2 is connected to both the modulo-2 aders 22 and 24; stage 3 is connected only to the modulo-2 adder 24; stage 4 is connected to modulo-2 adders 22 and 24; and stage 5 is connected only to the modulo-2 adder 24. The output of the modulo-2 adder 22 is connected to a second AND gate 26 and the output of the modulo-2 adder 24 is connected to a third AND gate 28. The other inputs to the three AND gates 20, 26 and 28, respectively, are timing pulses T–1, T–2 and T–3 which are provided by the clock 16 at a rate three times that of the provision of information pulses of line 12.

Thus, the timing pulses T–1, T–2 and T–3 occur in the interval between the reception of each two information pulses on line 12, and between the occurrence of two successive shift pulses. The outputs of the AND gates 26 and 28 are summed by an OR gate 30 and provided to a transmission line 32 which connects to a receiver and decoder generally indicated at 34.

This encoder arrangement acts to provide three output pulses on transmission line 32 for each information pulse received on line 12. The first pulse in this three pulse sequence, the one that occurs at T–1, is identical to the information pulse and is provided by AND gate 20. This occurs since the last information pulse received is stored in stage 1 of the shift register 14, and the output on line 32 simply constitutes a pulse in accordance with the condition of shift register stage 1 at T–1.

The second pulse in the three pulse sequence, provided at the output of AND gate 26 during T–2, constitutes the modulo-2 sum of the last information pulse received, plus the next preceding pulse (the contents of stage 2 of the shift register) plus the pulse which preceded the last received pulse by three (the contents of shift register stage 4). These three pulses are summed in modulo-2 adder 22 which provides a 1 as an output if an odd number of pulses occur in these three positions of the register, or a 0 as an output if an even number of pulses occur in these 3 stages. For example, if the 5 stages of the shift register 14 contained the digits 11001 a 0 will be provided as an output of the modulo-2 adder 22 sinces the two 1's are provided as its inputs. This pulse is gated out onto line 32 by AND gate 26 during time period T–2.

Similarly, a third pulse, relating to the last received pulses and the four pulses received before it, is provided to AND gate 28 and gated out onto line 32 during time period T–3. By providing three transmitted encoded pulses for each information pulse received, the encoder 10 has a "rate" of three, which is relatively inefficient, but with use of longer constraint lengths better rates could be achieved. Inherently, in order to add the needed redundancy to the encoded message, the rate of the encoder must be less than unity, but the previous Wozencraft and Jacobs references described encoders having varied rates, closer to one.

Figure 2:
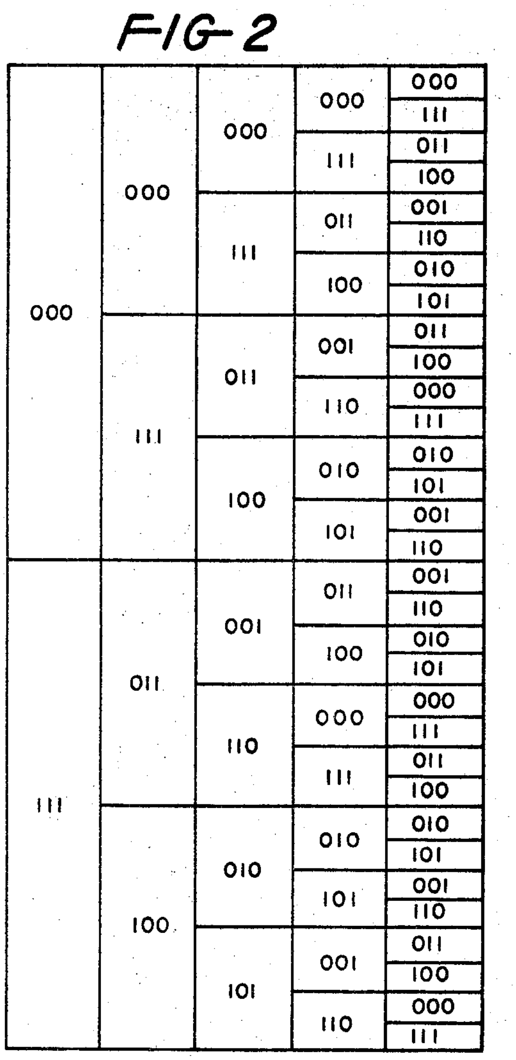
FIG. 2 is a representation of the code tree generated by a convolutional encoder employed with the preferred embodiment of the invention and used as a dictionary in the various embodiments of the decoder.

The encoder 10 generates encoder digit sequences which are illustrated in the code tree of FIG. 2. The numbers in the vertical columns represent the possible three digit code sequences, which may be transmitted for a given series of input digits on line 12. For example, if the shift register is initially empty and the first input digit is a 1, the output sequence will be 111. This digit sequence is contained in the lower half of the left-hand column in FIG. 2, and the digit sequences which would be generated by various combinations of succeeding digits are illustrated to the right of that section. If the inital digit was a 0, the output would be 000 and this is indicated in the top half of the left-hand column of FIG. 2, while the digit sequences which would be generated by various combinations following the initial 0 are illustrated to the right of this upper section. The tree is read from left to right and if any subsequent digit is a 0 the upper branch to the right is followed while if the subsequent digit is a 1 the lower branch to the right is followed. For example, the information digit sequence 11001 would produce the code groups 111 100 010 010 101.

The function of the receiver is to regenerate the input information pulse train 12 at the output line 36, despite error which are introduced in the transmission line 32. These errors may occur at random spacing, because of a relatively low signal/noise ratio on the line, or may occur in bursts, because of component failures and limitations. The decoder essentially compares the incoming message with all possible messages which might have been transmitted and assumes that the possible sequence that is closest to the received message is the proper one. If no errors were introduced in the message on the transmission line then the received message will identify exactly with one of the branches or with one of the possible messages.

The incoming message on line 32 is provided to a fifteen stage receiver shift register 38. The digits in this register are shifted in timed relation to the receipt of incoming digits by means of a synchronous clock 40 which provides a plurality of timing pulses as well as shift pulses delayed with respect to the timing pulses. As the pulses are received from line 32 they are advanced to successive stages of the shift register 38, until all fifteen stages contain pulses of the information sequence, which is equivalent to five full digits of information. Following such filling, the overflow pulses from stage 15 of the register 38 are grounded via line 41.

At this time, and each three time periods subsequently, the stages of register 38 provided via an AND gate 42 to a decoder matrix 50 which correlates its input with a possible message dictionary. Shift register 38 stages number 1, 2, 4, 7, 8, 10, 13 and 14 also have inputs from a digit decision network 46 which receives the output of the decision matrix 50. This network determines the condition of the last decoded digit of the message and provides pulses to its stages if the digit was a 1 and does not provide any pulse if the digit was a 0. When a pulse is provided from the digit decision 46 the states of the connected stages 44 are reversed.

This modification of the received digits is made to normalize the received digits into conformity with a fixed code tree contained in the decoder matrix 50. As will be subsequently disclosed, the various embodiments of the decoder matrix 50 each contain a mask or other form of matrix constructed about the initial section of the code tree disclosed in FIG. 2. In order to identify the first 15 digits received with the possible transmitted messages it is simply necessary to compare them with this fixed code tree. However, subsequently generated digit sequences represent elements beyond the right edge of the portion of the code tree illustrated in FIG. 2. Prior art decoders have continuously generated the sections to the right and attempted to compare them serially with the received digits. The present invention modifies the received digits so that they may be compared in parallel with the fixed tree section of FIG. 2 by means of the connections to the register 38 from the digit decision unit 46, biased on the decision as to the identity of the last information digit.

The particular manner of modification of the received digits in order to compare them with the fixed matrix is dependent upon the type of code tree generated by the encoder. For the present encoder and its initial code tree, it is necessary to add, in modulo-2 form, the "generator sequence" or the digit sequences which would be transmitted for the information digits 1000, in the event that the last decoded digit was a 1. In the event that the last decoded digit was a 0 it is not necessary to in any way modify the received digit sequences. (This may be considered a special case resulting from the construction of an encoder. In a more generalized situation it would be necessary to modify the received digit sequences even if the last decoded information digit were a 0.) These modifications may be determined by a study of the code tree of FIG. 2, wherein it can be seen that the effect of making the described modulo-2 additions is to shift a section on the code tree, one unit to the left.

Figure 1:
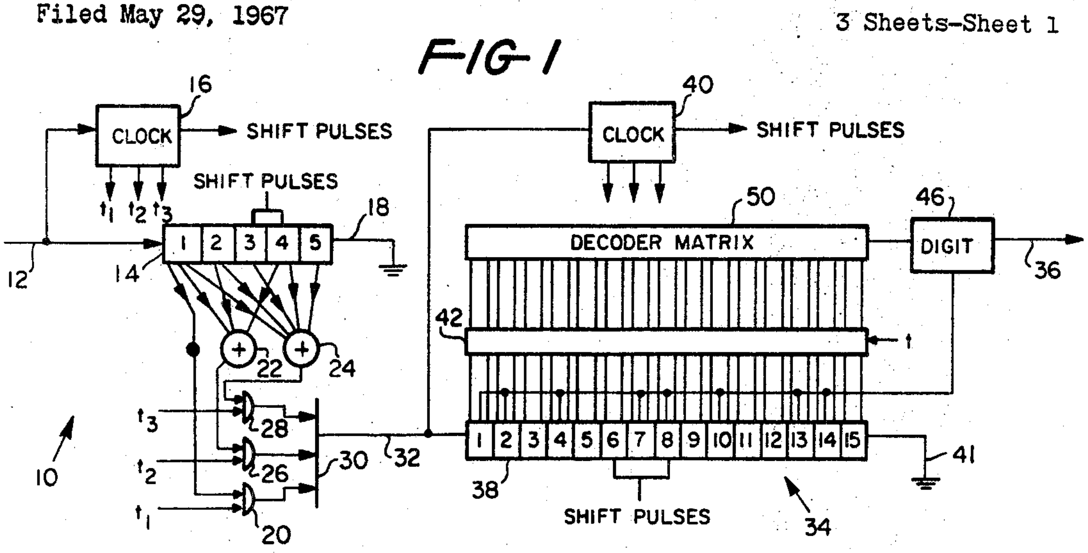
FIG. 1 is a block diagram of the system for convolutionally encoding, transmitting and sequentially decoding a binary message, employing a decoder formed in accordance with the present invention.

The block diagram of FIG. 1 is general, and may be employed with a variety of decoder matrixes formed in accordance with the present invention. The first of such matrixes is disclosed in FIGS. 3–6. It broadly employs three units; a lamp and lens system, generally indicated at 60, a mask 62, and a collecting lens and illumination level detector, generally indicated at 64.

Figure 4:
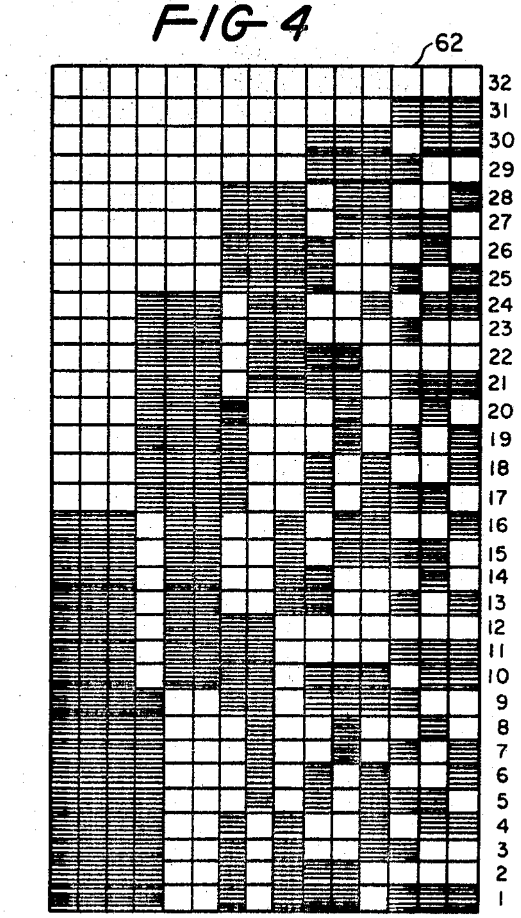
FIG. 4 is a front view of the mask employed in the optical section of the first embodiment of the invention.

Considering first the mask, it is shown in FIG. 4 and is based on the code tree of FIG. 2. Essentially it constitutes a 15 x 32 grid wherein the horizontal rows represent the digits in a 15 bit sequence, and the elements in any particular vertical column represent the possible identities of equivalent digits in a received sequence. Thus, the grid represents a code tree containing all possible 15 digit binary sequences which might be generated by the encoder 10. The mask is formed of two translucent materials, one of which transmits only red light, and is placed wherever a 0 occurs on the grid.

Figures 3, 5:
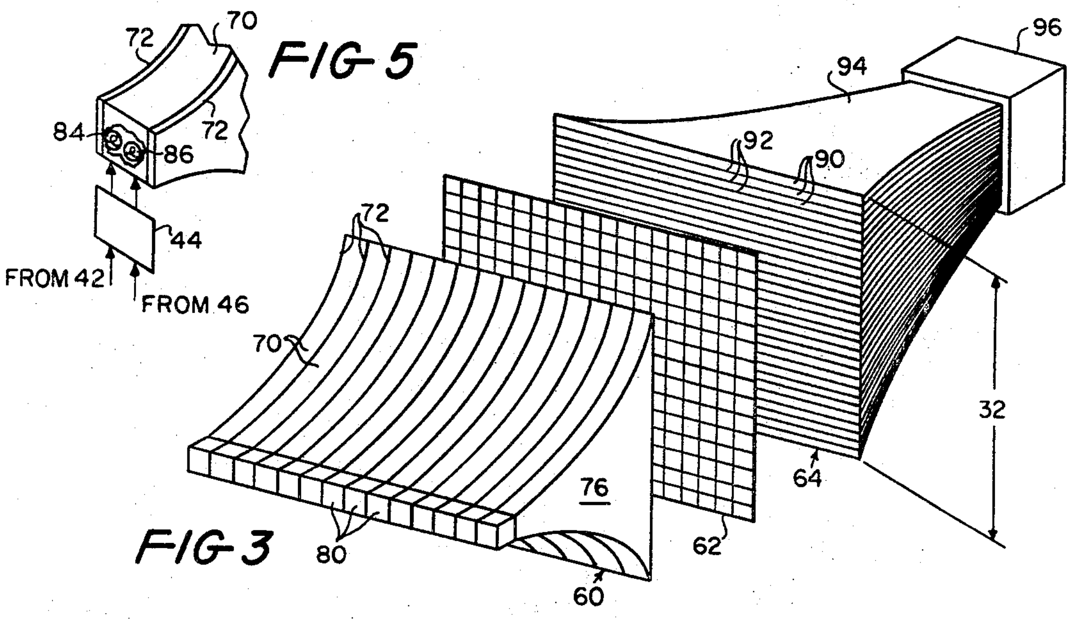
FIG. 3 is a perspective view of the optical section of decoding apparatus used in connection with a first embodiment of the invention.
FIG. 5 is a detailed perspective view of a lamp and lens apparatus used with the first embodiment of the invention.

The mask 62 is shown in FIG. 3 as being sandwiched between, but separated from the two adjacent faces of the lamp and lens section 60 and the lens and illumination level detector 64. This is done merely for purposes of illustration, and in practice the adjacent surfaces of the unit 60 and 64 would immediately abut the respective sides of the mask 62.

The unit 60 consists of fifteen spreading lenses 70. Each of the lenses is separated from adjacent lenses by an opaque sheet 72. The lenses 70 are trumpet-shaped, spreading from a relatively narrow width at one end 74 to a width equal to the vertical height of the mask 62 at their other ends 76. Each of the lenses 70 has a thickness slightly less than the thickness of one of the vertical columns on the mask 62 with the opaque sheets 72 spacing the lenses 70 so that they spread along the width equal to the horizontal dimension of the mask 62. When the wide ends of the lenses 70 abut one surface of the mask 62, the lenses 70 extend along the full length of each of the fifteen vertical columns of the mask.

Figure 6:
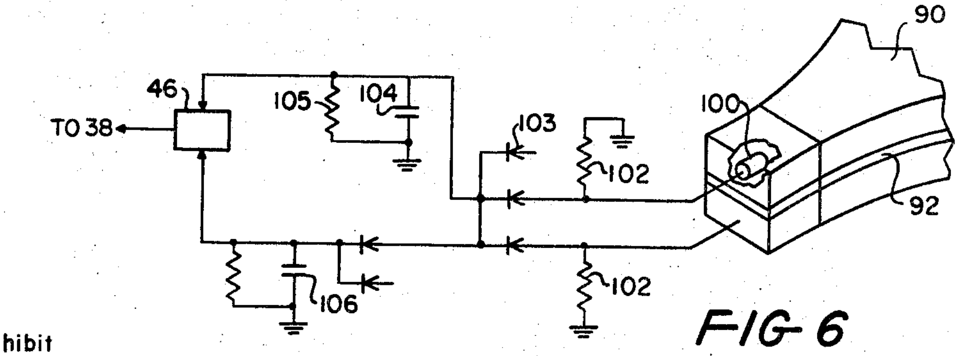
FIG. 6 is a detailed perspective view of an optical sensing apparatus used with the first embodiment of the invention.

Each of the lenses 70 has a light unit 80 affixed to its short truncated end 74, and opposite to the end which contacts the mask 62. The semischematic detailed view of one of the units 80 and its associated end of the lens 70 is illustrated in FIG. 6. It may be seen that each of the units 80 contains a pair of lamps, one a blue lamp 84 and the other a red lamp 86. Each of the lamps is connected to one of the outputs of the flip-flop 44 through appropriate driver circuitry (not shown). Accordingly, when one of the outputs of a stage of the register 38 is high the red lamp is energized, and when the other output is high the blue lamp is energized. Only one of the lamps will be energized at a time.

The lense 70 acts to spread the light of whichever of its lamps is illuminated along the entire height of one of the columns of the mask 62. If the red light is illuminated, light would be passed through the corresponding red sections of the vertical column which lens 70 serves and no light will be passed through the blue sections. Conversely, if the blue lamp is illuminated, light will be passed through the blue sections in that column and no light will be passed through the red sections. At any given time either the red or the blue lamp is illuminated in each of the units 80, depending upon the condition of the associated stage of register 38.

The unit 64 consists of a stack of lenses 90 of the same shape as the lenses 70, but thinner, arranged in a stack of 32 and oriented horizontally. Thin opaque separators 92 are disposed between each of the lenses 90. The lenses 90 coincide with the horizontal rows of the mask 62 and receive light through each element in a row when the color of that element coincides with the illumination being provided by the associated lens 70 in the vertical column in which that element is disposed. The lenses 90 act to sum this light at their narrow truncated ends 94 and to provide the light to an illumination detection system 96.

Referring to FIG. 6 the unit 96 contains a plurality of photo emissive semiconductors elements 100, one for each of the lens 90, each of which provides its output to a summing resistor 102. The summing resistors 102 connected to the photo emissive elements 100 contained in the units 96 in the upper half of the lens stack 90 provide their voltages through diodes 103 to a peak detector consisting of a capacitor 104 shunted by resistor 105. The photo emissive elements 100 in the lower half of the stack are similarly connected to a peak detector capacitor 106. The voltages across the capacitors 104 and 106 are provided to a decision unit 46 which provides a pulse output to its connected stages of the shift register 38 if the voltage across the capacitor 104 is higher than the voltage across the capacitor 106.

The photo emissive elements 100 are equally sensitive to red or blue light, thus their voltage output is proportional to the total number of elements in the associated row which their lens contacts, which are passing light. The capacitor 104 thus experiences voltage proportional to the highest number of elements which are passing light in the top half of the mask.

Similarly the capacitor 106 experiences a voltage proportional to the maximum number of elements passing light in any one row in the lower half of the mask 62. The decision unit 46 thus receives two voltages proportional to the maximum light transmission in any row of the top half and in any row in the bottom half of the mask. If the voltage provided by the capacitor 106 is larger than that provided by the converter 108, the numbers contained in the register 38 correlates better with some row in the lower half of the mask than any row in the upper half. Accordingly, the decision unit provides an output indicating that the most significant digit of the sequence is a 1. A signal is simultaneously sent out to those stages of the register 38 to which the decision unit 46 is connected, so that the next number will be properly modified for comparison with the decoder matrix 50.

While the preferred embodiment of the invention simply makes a decision based on the half of the mask with which the modified received digit sequence best correlates, more sophisticated forms of decision making are possible. For example, the difference between the correlations with the bottom half and the top half might be quantitatively compared, and if they are not sufficiently different, an assumption might be made that the last digit of decision was incorrect, and this decision could be reversed and another comparison made to see if the quantitative results improve. This technique resembles the search processes used with the decoders of the prior art. Alternatively, since the received digit sequence as modified should correlate better with a number of elements in one half than any element in the other half, decisions based on such correlation might be made.

During the entire process the clock 40 is connected to each of the elements so as to provide the desired timing sequence, in accordance with known digit computer practice.

Figure 7:
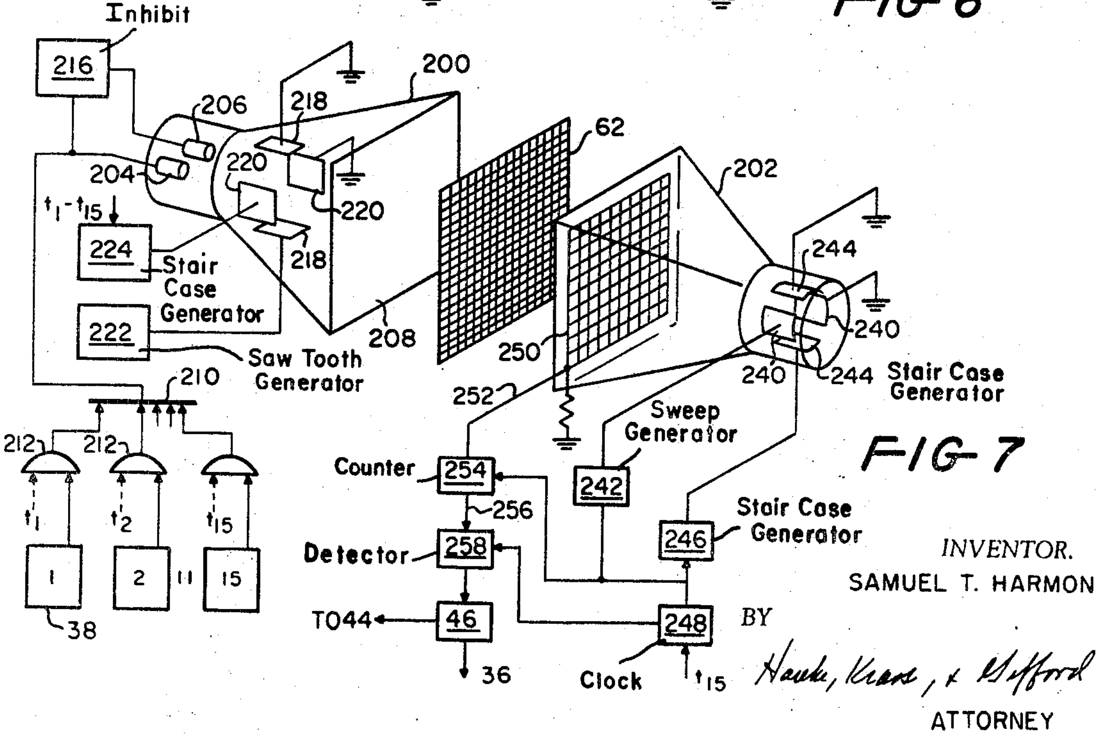
FIG. 7 is a perspective view of a second embodiment of decoding apparatus formed in accordance with the present invention.

The apparatus illustrated in FIG. 7 represents an alternative to the apparatus of FIG. 3. It may be used in the same manner as the apparatus of the first embodiment of the invention. It employs a mask 62 which is identical to that shown in FIG. 4. The mask is sandwiched between the face of a cathode ray tube 200 and in the face of a vidicon tube 202. The three units are shown spacially separated in FIG. 7 in order to better illustrate their construction, but in practice the faces of the cathode ray tube 200 and vidicon 202 would be indirect abutment with the opposite sides of the mask 62.

The cathode ray tube 200 replaces the lamp and lens system 60 and acts to generate the vertical bars of either of two colors at positions on the face of the tube which are in alignment with the columns of the mask 62. The cathode ray tube 200 may be of the type generally employed with color television receivers at this time. It utilizes a pair of guns 204 and 206 which are so aligned with a mask (not shown) disposed immediately behind the tube face 208 that electron beams generated by the gun 204 energize only blue phosphorous disposed on the face 208 while electron beams generated by the gun 206 energize only red phosphorous. The red and blue phosphorous are formed on the face 208 in pairs associated with holes in the face mask seems to experience electrons emitted by only one of the guns. Other forms of multicolored cathode ray tubes may also be employed.

The blue gun 204 is energized by signals from an OR gate 210 which receives the output of a plurality of AND gates 212. Each of the AND gates receives the output of the high side of one of the stages of the register 38 (FIG. 1) and one of the series of timing signals T–1–T–15. Accordingly, during the time period T–1–T–15 the contents of the register 38 are successively scanned by the OR gate 210 and pulses are provided to the blue gun 204 when the flip-flops are high, or in their 1 state. The red gun 206 is normally energized and is inhibited by a gate 216 at such time as a signal is received from the OR gate 210. Accordingly, when the particular flip-flop is in its low, or 0 state, the red gun 206 will emit an electron beam, and during any time period in which a flip-flop 44 carrying a 1 is being scanned the red gun 206 will be inhibited and the blue gun 204 will be energized.

The electron beams emitted by the guns 204 and 206 are subjected to electrostatic fields generated by a pair of vertical deflection plates 218 and horizontal deflection plates 220. The vertical deflection plates are energized by a saw-tooth generator 222 so as to cause the electron beam to undergo a rapid, reciprocating vertical movement. The rate of the saw-tooth generator is substantially in excess of that of the timing pulses T–1–T–15. The horizontal deflection plates 220 are connected to a staircase generator 224 which receives the timing pulse T–1–T–15. During each timing pulse the staircase generator provides successively higher voltages to the plates 220 so as to move the vertical band generated by the vertical deflection plates 218 into successive horizontal positions along the face of the tube. Thus, during the timing period T–1–T–15 a series of vertical bands having colors dependent upon the condition of the stages of the register 38 occur on the face 208 of a cathode ray tube 200. The cathode ray tube is of the high persistent type so that at the end of the timing pulse sequence all of the colored bands remain upon the face of the tube. Appropriate means are provided to many of the display previous to the generation of the next band series. Accordingly, the face of the cathode ray tube 208 at the end of the timing period T–15 exhibits identical color bands to those displayed by the light and lens systems 60.

The face of the vidicon 202 thus experiences an array of light segments which is dependent upon the coincidence of the light bands displayed on the cathode ray tube face with the colored elements of the matrix 62. The number of illuminated elements in any horizontal row across the face of the vidicon will be a measure of the correlation between a coded signal carried on the flip-flops 44 and a dictionary matrix of the mask 62. The horizontal position of the beam of the vidicon tube 202 is controlled by a horizontal deflection coil 240 under the control of a horizontal sweep generator 242. The vertical position of the scan is controlled by a pair of vertical deflection coils 244 under the control of a staircase generator 246. At timing pulse T–15, a vidicon clock 248 is energized. During the next timing period, the clock sends a series of pulses to the staircase generator 246 which causes the vidicon sweep to occupy successive vertical levels. Each of these pulses energizes the horizontal sweep generator 242 to move the beam horizontally across the tube. Thus, successive rows of the face are scanned and each time an element which received light through the mask 62 is scanned a pulse output is provided by the screen grid 250. These pulses are provided on line 252 to a counter unit 254 which is initially set to 0 by each pulse from the vidicon clock 248. Accordingly, the pulses from the screen 250 during one horizontal sweep of a row are provided to the counter.

Counter 254 is of the preset type and its preset is automatically adjusted to the maximum number of pulses received in any vidicon clock period from the line 252. Thus, during the first horizontal sweep of the vidicon the preset is adjusted to the number of pulses received during that sweep. During the next period, if the number of pulses received is greater than those received during the first period the preset value is adjusted upward accordingly. Each time the preset is adjusted upwardly, signifying that the pulse train received during that period is larger than any received previously, an output pulse is provided on line 256. This pulse is provided to a detector unit 258 which also receives the timing pulses from the vidicon clock unit 248. The pulses from the vidicon clock are stored in a coded manner to identify the period in which overflow pulses are received on line 256. Each time another signal is received on line 256 the previous store in the detector identifying the previous clock period is erased and the period of the current pulse is recorded.

At the end of the series of vidicon pulses the detector 258 has stored the identification of the vidicon clock pulse period during which the largest number of pulses emerged on line 252. This is also the period in which the vidicon sweeps scan the row of the matrix containing the element which identified best with the number stored in register 38. If this period was during the first half of the periods of the vidicon sweep, the number contained in the register 38 thus correlates with a number in the lower half of the mask grid and a signal is sent to unit 46 causing a 1 to be emitted on line 36 and causing a modification pulse to be sent to connected stages of register 38. If the clock period in which the maximum number of pulses occurred was in the second half of the vidicon clock pulse series the number contained in the register 38 best correlates with a 0 and, accordingly, no pulse is provided to unit 46.

The embodiment of the invention disclosed in FIG. 8 employs a diode matrix, generally indicated at 300, to perform the function of the decoder matrix 50 in FIG. 1. To simplify the disclosure, only a corner of the diode matrix, equivalent to the lower right-hand corner of the matrix 62 of FIG. 4, is disclosed. The matrix includes pairs of vertical lines **302*a* and 302*b*, 304*a* and 304*b*, 306*a* and 306*b*, 308*a* and 308*b*, 310*a* and 310*b*, and 312*a* and 312*b*. Each line pair is connected to the output of one of a series of gates 314, 316, 318, 320, 322 or 324. The gates 314–324 are conditioned by timing pulses, T–11–T–15 respectively. The inputs to the gates 314–324 are connected to the AND gate 42. One of the lines in each pair forming the input to the AND gate is energized depending upon the state of the digits contained in the shift register 38**. If a 1 is contained in the shift register a pulse is provided to the *a* line in each pair upon the occurrence of the appropriate timing pulse, and if a 0 is contained in a particular shift register stage a pulse output is provided on the *b* lines during the appropriate time periods.

The horizontal lines in the matrix 326, 328, 330, 332, 334, 336 and 338 are each connected to one analog storage unit 340, 342, 344, 346, 348, 350 or 352. The storage units may be of a capacitive type disclosed on page 409 of "Digital Computer Components and Circuits," by Richards, D. VanNostrum Company, Princeton, N.J., 1959.

The horizontal lines 326–338 are connected to one of each pair of lines 302–312 by means of diodes 354. The diode connections are made in accordance with the basic matrix pattern, where the 1 connects to an *a* line and the 0 connects to a *b* line.

Accordingly, during the scanning of the gates 314–324, pulses will be provided to the vertical lines, and through the diodes to the horizontal lines and to storage units 340–352, in accordance with the matrix pattern. The count contained in each of the units 340–352 at the end of a pulse sequence will then be representative of the number of coincidences between the code word contained in its connection pattern and the received digital sequence. Thus, if a number stored in the register 38 exactly correlates with one of the horizontal rows of the matrix formed by the conenction of the lines **302–312*a* and *b* to the horizontal lines, a voltage representative of fifteen pulses will be stored in the unit 340–352 connected to that horizontal line. All of the counts stored in the units 340–352 for the lower half of the matrix, after timing period T–15, are fed to a counter 360 which then maintains a count proportional to the highest amount of pulses fed in any of the lines in the lower half of the matrix. A similar counter 362 receives connections from the counter connected to the horizontal lines in the upper half of the matrix (not shown). The outputs of the two counters 360 and 362 are fed to unit 46 which provides an output pulse to the connected stages of the storage register 38 if the number contained in counter 360 is greater than the number in counter 362**.

The embodiment illustrated in FIG. 9 differs from the previous embodiments in that it does not maintain a stationary matrix representing all possible initial message sequences, but rather generates that matrix by successively generating parallel representations of the horizontal rows of the matrix, or possible words in the stationary dictionary.

This generation is performed by a counter chain of flip-flops 400, 402, 404, 406 and 408 which are connected in a series and which have timing pulses T as their input at the flip-flop 408. Each of the high outputs of the flip-flops 400–408 makes connection to certain of a series of modulo-2 adders 410. The connections between the flip-flop train 400–408 and the modulo-2 adders 410 are formed in accordance with the connections between the counter stages 14 and the modulo-2 adders 22 and 24, illustrated in the encoder in FIG. 9. The connections are such that an absence of any other inputs to the modulo-2 adders 410, their outputs would represent the fifteen digits of an encoded message corresponding to the five input digits contained in the counter chain 400–408. The counter chain 400–408 initially has all of its flip-flops at their low states. The first pulse switches the flip-flop 408 to its high state; the second pulse switches the flip-flop 408 back to its low state and provides a pulse to the flip-flop 406 converting it to its high state. After 31 pulses, the counter stages 400–408 will have undergone all possible five digit message sequences, including the 00000 state before the receipt of the first timing pulse. Accordingly, in the absence of further inputs, the outputs of the modulo-2 adders 410 would represent all 32 possible encoded message.

Each of the modulo-2 adders also has an input from one of the stages of the shift register 38. If a 1 is contained in that stage at any particular time an additional input is provided to the modulo-2 adder, thus reversing its output state. The modulo-2 adders thus act as comparators for the states of the possible message and the received message; if the two are in agreement, the modulo-2 adder has a high output, and if the two are in disagreement it has a low output. Each of the modulo-2 adders 410 provides output to a summing resistor 411 when its output is high. These resistors are connected through diodes 412 to a summing unit 414 which experiences a voltage proportional to the agreement between the digit sequence being generated by the modulo-2 adders and the digit sequence contained in register 38. The unit 414 provides output to a storage unit 416, which also has timing pulses *t* as its input. The unit stores the time identity of the period in which the highest voltage is received from 416. After 32 timing pulses, if the time period stored represents the first sixteen, or the upper half of the matrix, no output is provided to the unit 418. However, if the timing period in which the highest voltage occurred is during the second sixteen digits, a 1 is provided to the unit 46 and the digits in the shift register 38 are accordingly modified.

A numerical example will assist in the understanding of the operation of any of the embodiments of the invention. Assume that an information input to the system on line 12 consists of the digits 1011010. Assuming the generator shift register 14 to be initially empty, when the first information digit is in the first stage of the register the output of the three gates 20, 26 and 28 will be the pulse sequence 111 since the first stage is connected to the modulo-2 adder gates 22 and 24, as well as to the gate 20. Following the shift of the 1 into the second stage the output of the three gates 20, 26 and 28 will be the sequence 011. A similar analysis will show that the seven digit information sequence will produce the following encoded pulse sequence:

111 011 001 111 011 101 001

This pulse sequence is transmitted on line 32 and the first fifteen digits thereof are admitted into the shift register 38. Using any of the embodiments of the decoder matrix 50 it would be determined that digit sequence best correlates with row 7 of the matrix shown in FIG. 4. Even if one or two digits were inverted during the transmission process the fifteen digit message would still provide the best correlation with this row. Accordingly, since the row is in the bottom half of the matrix, a 1 is provided on line 36 as the first digit of the sequence and a signal is sent to those of the stages of register 38 which are connected to the unit 46, causing them to change state. Then the next three digits, 101, of the encoded message sequence are admitted to the first three stages of the shift register 38, and the rest of the information sequence is shifted three stages to the right, expelling the last three digits. The modification of the first, second, fourth, seventh, eighth, tenth, thirteenth, fourteenth and fifteenth digits by the input from unit 46, and the shifting, produces the following bit sequence in the register 38:

000 111 100 010 101

This correlates identically with the nineteenth row of the grid, in the upper half, and, accordingly, the 0 is provided on line 36, resulting in no modification of the information sequence, and the contents of the register 38 are again shifted three stages to the right. The information now contained in the register is the digit sequence 111 100 010 101 001. An examination of the matrix of FIG. 4 indicates that this best correlates with the sixth horizontal row from the bottom of the matrix, and accordingly the first digit of the sequence is a 1. Accordingly, the digits are again modified and shifted. The shift might be performed before the modification.

A continuation of this numerical example will show that the correct digit sequence 1011010 is provided as an output from the unit 46.

While the preferred embodiments of the invention have been described in connection with a binary number system, it should be noted that they are equally applicable to number systems of higher base. For example, the embodiment of FIGS. 3–6 could be formed with a mask 62 having areas thereon which can select one of a higher number of colors such as 10, and the light generating unit 60 could be made to produce any one of such ten colors. Equipment would thus be useful with a decimal number system with the attendant advantages thereof. Similarly, the equipment of the other embodiments could be expanded to higher base systems.

With particular regard to the equipment of FIG. 9, the generator 400–408, which provides successive rows of a matrix, might be controlled more selectively, to minimize the time required in the search process. For example, if the incoming information is received error free, an exact identity between the generated row and the received digital information would be created if the first digit in each three bit received sequence, were provided in parallel to the flip-flops 400–408, and their interconnections were momentarily inhibited. If this were done and some lack of identity was found between the generated matrix row and the received information data, the nature of the discrepancy might be used to determine the nature of the error in the received data.

All of the embodiments of the invention incorporate the common factors of maintaining the matrix stationary and modifying the incoming digit sequence based on determinations of previous digits. Also, the comparison of the incoming sequence with the possible messages is made in parallel, although in the case of the embodiment of FIG. 9 one line at a time of a matrix is compared with the incoming sequence.

While the embodiments disclosed herein have operated on a binary system, it is obvious that the broad concepts of the present invention are equally applicable to more complex number systems.

Having thus described my invention, I claim:

1. A decoder and error corrector for convolutionally encoded digital data, comprising: means for storing an initial section of a convolutionally encoded message; a source of the initial sections of certain possible convolutionally encoded messages; means for comparing said stored initial section of the convolutionally encoded message with each of the possible convolutionally encoded messages from the source; means for making an estimate of an initial digit of said convolutionally encoded message based on the outcome of such comparison; means for modifying the stored initial section of the convolutionally encoded message in accordance with the estimate of the initial digit; and means for replacing a section of the stored initial message section with a subsequent message section.

2. The decoder and error corrector of claim 1 wherein the source of initial sections of certain possible convolutionally encoded messages includes means for providing the initial sections of all possible convolutionally encoded messages which might be contained in the message to said comparing means.

3. The decoder and error corrector of claim 1 wherein the source of the initial sections of certain convolutionally encoded messages includes means for providing all such sections simultaneously and the means for comparing said sections with the stored initial section of a convolutional message makes the comparison in parallel.

4. The decoder and error corrector of claim 1 wherein said means for comparing is a means for sequentially comparing the stored initial section of a convolutionally encoded message with the initial sections of certain possible convolutionally encoded messages from the source.

5. The decoder and error corrector of claim 1 wherein the means for modifying the stored initial section of the convolutionally encoded message includes means for changing the state of certain of the digits thereof, such change of state being dependent upon the convolutional code employed, and the estimate of the initial digit.

6. The decoder and error corrector of claim 1 wherein means is provided for causing the apparatus to undergo a repetitive cycle wherein the section of the convolutional encoded message contained in the storing means is repetitively compared with the possible message sections contained in the source, modified in accordance with the estimate of its initial digit, and revised by discarding an initial section and adding a subsequent section of convolutionally encoded data.

7. The decoder and error corrector of claim 1 wherein means is provided for causing the apparatus to undergo a repetitive cycle wherein the section of convolutionally encoded message contained in the storing means is repetitively compared with the possible message sections contained in the source and is revised by discarding its initial section and adding a subsequent section of convolutionally encoded data, and is then modified in accordance with the estimate of its previous initial digit.

8. The decoder and error corrector of claim 1 wherein the source of the initial sections of certain possible convolutionally encoded messages consists of a rectangular matrix consisting of a pluraltiy of elements wherein the elements arrayed along one axis consist of initial sections of possible convolutionally encoded messages, and the elements along the other dimension consist of possible states of particular digits in various possible convolutionally encoded messages.

9. The decoder and error corrector of claim 1 wherein the source of initial sections of certain possible convolutionally encoded messages consists of a generator which sequentially produces each of the possible message sections in parallel configuration.

10. A decoder and error corrector for convolutionally encoded messages, comprising: means for storing a plurality of digits of a convolutionally encoded message; a source for providing a plurality of digits of a possible encoded message sequence, in parallel; means for performing a parallel comparison between the digits contained in the storage means and the possible digit sequence, to determine the probability that the stored digit sequence was originally each of the possible digit sequences; and means for discarding a portion of the stored digit sequence and adding a portion of a subsequent digit sequence to said storage.

11. The decoder and error corrector of claim 10 wherein said source includes means for providing said number of possible digit sequences in parallel and said means for ismultaneously comparing said sequences with said stored digit sequence operates in parallel to perform all of said comparisons simultaneously.

12. The decoder and error corrector of claim 10 wherein said source includes means for providing a number of possible digit sequences sequentially.

13. The decoder and error corrector of claim 10 wherein source includes means for simultaneously providing all possible digit sequences for simultaneous parallel comparison with the stored digit esquence.

14. A decoder and error corrector for convolutionally encoded digital data, comprising: means for storing an initial section of a convolutionally encoded message; means for making an estimate of an initial digit of said convolutionally encoded message; means for modifying the stored initial section of the convolutionally encoded message in a manner dependent upon the estimate of the initial digit; and means for replacing a section of the stored initial message section with a subsequent message section.

15. The decoder and error corrector of claim 14 wherein said means for making modifications in the stored initial section of the convolutionally encoded message is configured as a function of the form of convolutional encoding of the message.

16. The decoder and error corrector of claim 15, wherein said convolutionally encoded data includes information bits and encoded bits.

References Cited

UNITED STATES PATENTS

| | | | |
|---|---|---|---|
| 3,075,147 | 1/1963 | Llewellyn | 315—8.5 X |
| 3,201,783 | 8/1965 | Zendeh | 340—347 |
| 3,388,240 | 6/1968 | Robbins | 340—146.3 X |

MALCOLM A. MORRISON, Primary Examiner

R. S. DILDINE, Jr., Assistant Examiner

U.S. Cl. X.R.

340—165, 166; 315—8.6